April 21, 1931. D. F. MERLINO 1,801,967
AUTOMATIC PRESS FOR THE MANUFACTURE OF MACARONI PRODUCTS
Filed Jan. 9, 1928 5 Sheets-Sheet 3

INVENTOR:
Domenico F. Merlino
BY
White, Frost & Fryer
ATTORNEYS.

April 21, 1931. D. F. MERLINO 1,801,967

AUTOMATIC PRESS FOR THE MANUFACTURE OF MACARONI PRODUCTS

Filed Jan. 9, 1928 5 Sheets-Sheet 4

INVENTOR:
Domenico F. Merlino
BY
ATTORNEYS.

April 21, 1931.  D. F. MERLINO  1,801,967
AUTOMATIC PRESS FOR THE MANUFACTURE OF MACARONI PRODUCTS
Filed Jan. 9, 1928  5 Sheets-Sheet 5
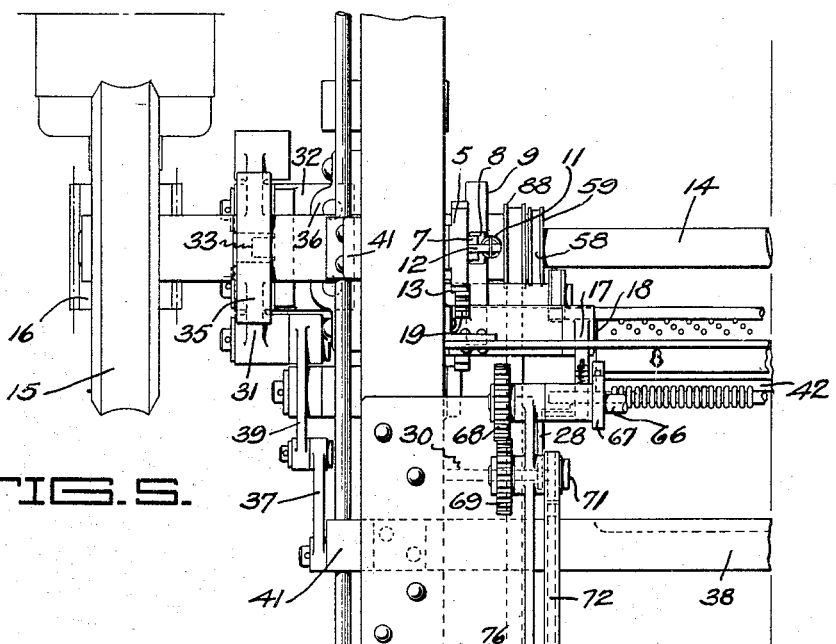
FIG.5.
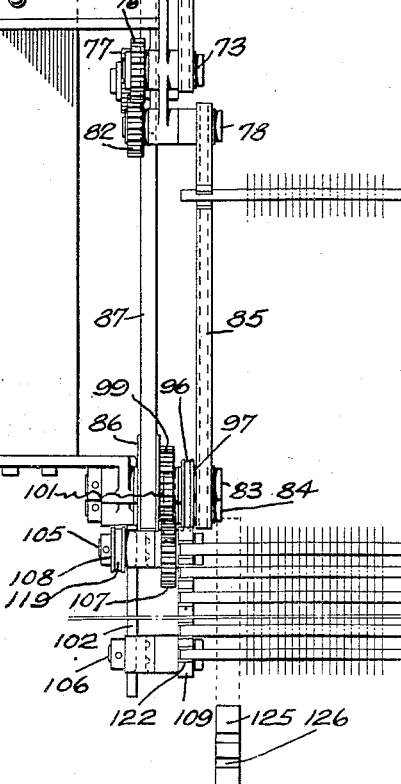
FIG.6.
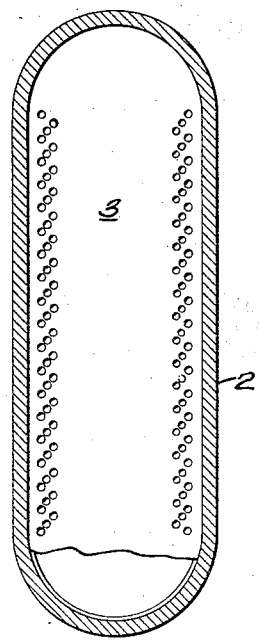
INVENTOR:
Domenico F. Merlino
BY
White, Prost & Fryer
ATTORNEYS.

Patented Apr. 21, 1931

1,801,967

UNITED STATES PATENT OFFICE

DOMENICO F. MERLINO, OF FRESNO, CALIFORNIA, ASSIGNOR OF ONE-HALF TO ALFONSO BORRELLI, OF FRESNO, CALIFORNIA

AUTOMATIC PRESS FOR THE MANUFACTURE OF MACARONI PRODUCTS

Application filed January 9, 1928. Serial No. 245,326.

My invention relates in general to those classes of machines or presses which are employed in the art of expressing masses of edible material in the form of dough, such as macaroni, into string-like forms, either solid or tubular. In the manufacture of macaroni the dough is put into cylinders provided at one end with die plates through which the dough is extruded by means of a piston operated by hydraulic means or by screws. The dough strings extruded through the die are hung or looped over rods, cut at a predetermined length and then conveyed away onto racks. The apertures in the dies are customarily tapered in order to accommodate the cores or mandrels which effect or produce the tubularly shaped products. Due to the tapered configuration of the apertures and due to the necessity of providing a certain amount of metal between the apertures, the distance between centers is several times that of the diameter of the extruded macaroni. In order to increase the number of dough strings produced by one die it is customary to provide the die with a plurality of staggered apertures. The first row of apertures is fairly close to the periphery of the die, the second row of apertures is somewhat closer to the center of the die and the apertures in this row are staggered with respect to the first row. The third row of apertures is still closer to the center of the die and the apertures in this row are staggered with respect to both the first and second rows of apertures. When the centers of all these apertures are projected on a line parallel to one of the rows, it will be found that the distance between any two adjacent centers is slightly greater than the diameter of an extruded macaroni. When the dough is put into the press or cylinders its temperature is relatively high. Due to conduction and radiation of the walls of the press the dough in close proximity to the walls of the press conducts part of its heat to the walls and consequently becomes less pliable. As a result of the variations in plasticity of the dough in the press, it is found that the rate at which the dough strings are extruded from the die, varies accordingly. The dough strings extruded from the apertures closest to the center of the press are formed much more rapidly than the dough extruded from the apertures near the periphery of the press. For packing purposes the ends of the loops of macaroni should be substantially even, for this permits of the more efficient packing of the macaroni and also presents a better appearing package to the eye. In trimming the ends of the macaroni a substantial loss is incurred. The method usually used to overcome this difficulty is to surround the press or cylinder with a steam or water jacket which tends to maintain an even temperature throughout the dough. However, when the dough strings are extruded from the press, due to their own weight, they are stretched and the amount of stretch of each string varies and continues after the strings have been looped over the rods. This variation in stretch also necessitates that the loops be trimmed and usually at both ends of the loops. Up to this time there has been no known method or machine which will do away with the loss incurred by so trimming the ends of the loops.

In general it is the object of this invention to provide a macaroni machine in which the ends of the macaroni loops are sufficiently even to do away with any necessity of trimming and therefore to cut down the waste so incurred.

Another object of the invention is to produce a macaroni machine which operates automatically from the time that the dough cylinders are filled to the time that the looped macaroni is automatically taken from the packing racks.

Another object of the invention is to provide a macaroni machine in which the extruded dough strings are so looped and cut that the variations in the stretch undergone by each string is reduced to a minimum.

The invention possesses other advantageous features, some of which with the foregoing, will be set forth at length in the following description, where I shall outline in full that form of the invention which I have selected for illustration in the drawings accompanying and forming part of the present specification. In said drawings I have shown one form of macaroni machine embodying my invention, but it is to be understood that I do not limit myself to such form, since the invention as set forth in the claims may be embodied in a plurality of forms.

Referring to the drawings:

Fig. 5 is a plan view of my device.

Fig. 6 is a section of the press or cylinders taken on the line 6—6 of Fig. 1 showing the staggered orientation of the apertures in the die members.

Fig. 7 is a detailed view of the retaining mechanism at the end of the swinging rod support.

Figure 3:
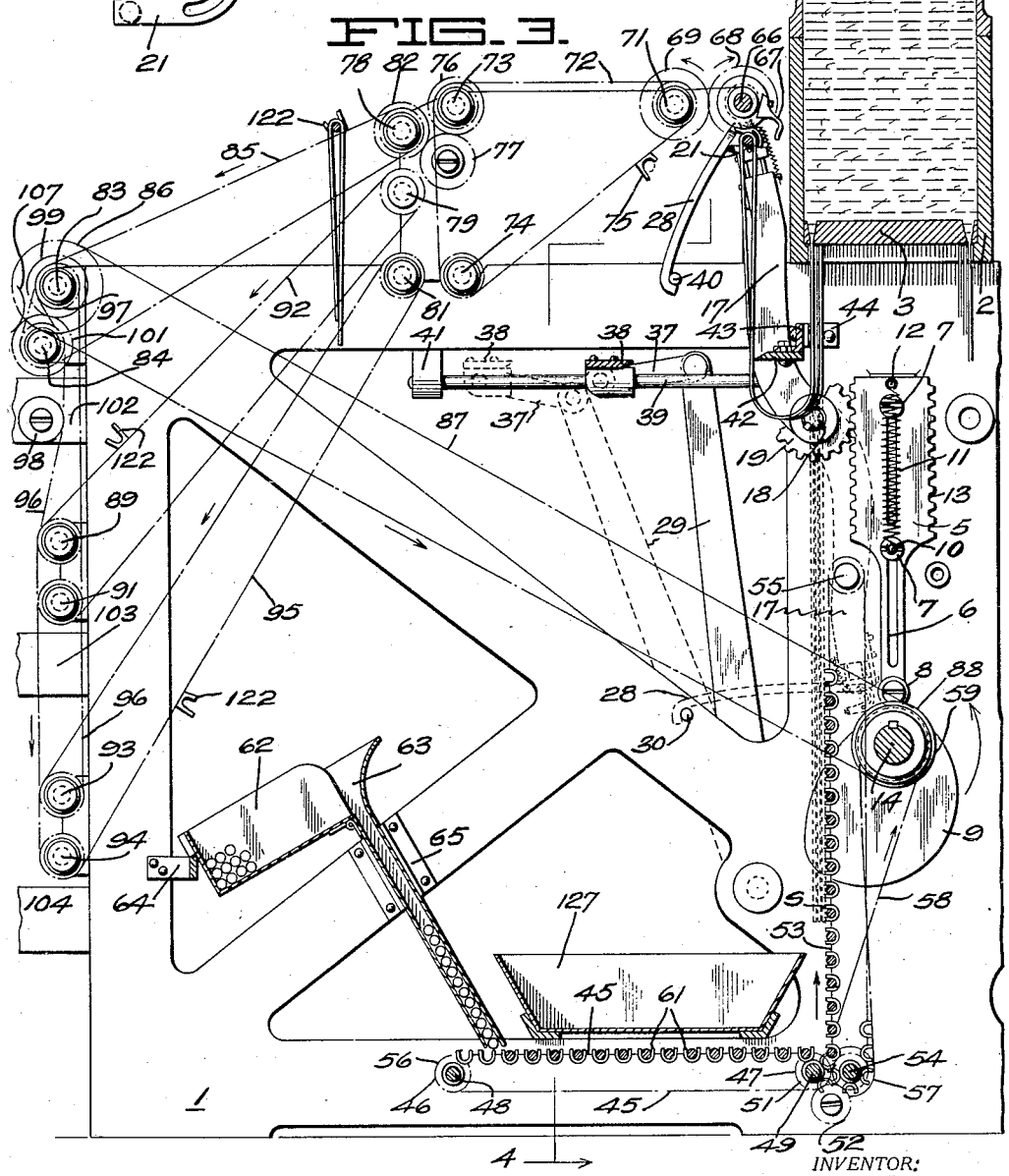
Fig. 3 is a vertical section of my improved device taken on the line 3—3 of Fig. 2 and looking in the direction as indicated by the arrows.
Figure 4:
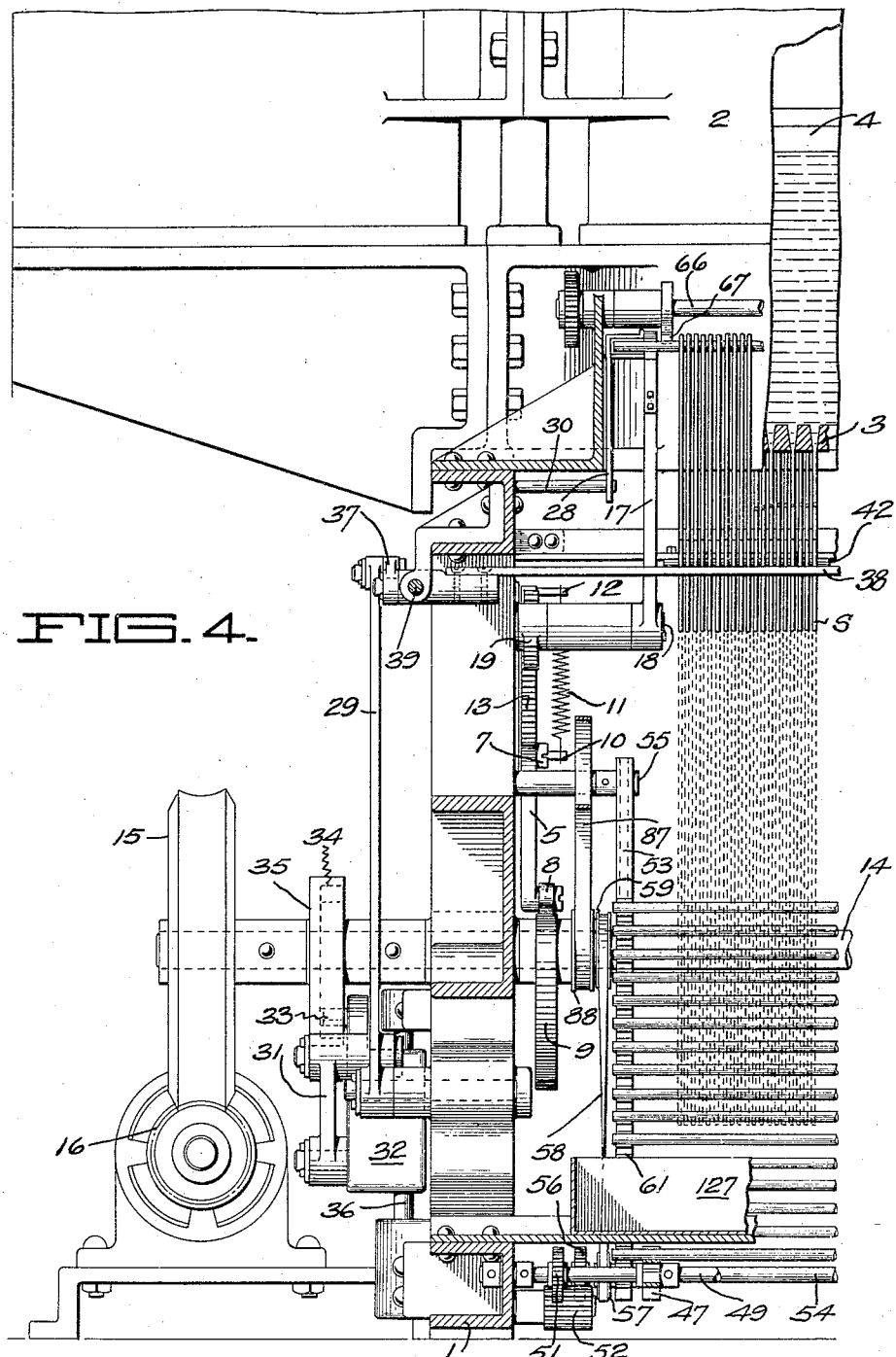
Fig. 4 is a sectional elevation taken on the broken line 4—4 of Fig. 3 looking in the direction as indicated by the arrows.

My invention comprises a frame 1 on which is supported a plurality of dough cylinders 2 (Fig. 3). At the bottom of each cylinder is an apertured die 3, the apertures of which are tapered and are arranged in parallel staggered rows. The tapered portion of each aperture supports the webs of a small mandrel, the mandrels being effective in producing the hole in the macaroni. Longitudinally slidable in cylinders 2 are hydraulically operated pistons 4. Longitudinally slidable racks 5 are secured to the inner faces of each side of the frame. These racks, as best shown in Fig. 3, are provided with a longitudinal slot 6 and are secured to the frame by means of screws 7. Journaled at the bottom of each rack 5 is a roller bearing 8 which is resiliently held in rolling contact with a cam 9 by means of a spring 11. The upper end of the spring 11 is secured to the rack by means of a pin 12, while the lower end of the spring is secured to the frame 1 by means of the pin 10 secured to the head of the screws 7. It will be noted that the rack 5 is provided with gear teeth 13 on both the vertical edges, and that my machine is symmetrical with respect to a center line coincident with the axes of the piston 4. Only one-half of my machine has therefore been shown in the drawings, but it is to be understood that it is of the duplex type. The cams 9 are keyed to a main shaft 14. The main shaft 14 is journaled by means of suitable bearings to the frame 1 and has keyed to it at one end of its ends a gear 15 which meshes with a motor driven worm 16. Rod supporting arms 17 are keyed to a shaft 18 which in turn is journaled to the frame 1 by means of any suitable bearings. As best shown in Figs. 3 and 4 one end of the shaft 18 has keyed to it a gear sector 19. The teeth of the gear sector 19 mesh with the teeth of the racks 5 and it will be noted that as the cam 9 is made to rotate by means of the motor driven worm 16, the rack 5 is given a vertical movement and the arm 17 in turn is made to rotate about its shaft 18. The outer end of the arm 17 is provided with a U-shaped rod retaining member 21. As best shown in Fig. 7 the member 21 is provided with a slot 22, through which a pin 23 is threaded. The ends of the pin 23 are engaged in the sides of a channeled head 24. The head 24 is resiliently held at the end of the arm 17 by means of spring-pressed pins 25, and a slotted guide member 26. One end of the spring 27 is secured to one leg of the rod retaining member 21 while the other end of said spring is secured to the arm 17. The function of this spring is to insure the turning of the U-shaped member 21 to its open position. Pivoted to one end of the U-shaped member 21 is a hook 28, the purpose of which will be described later.

Figure 1:
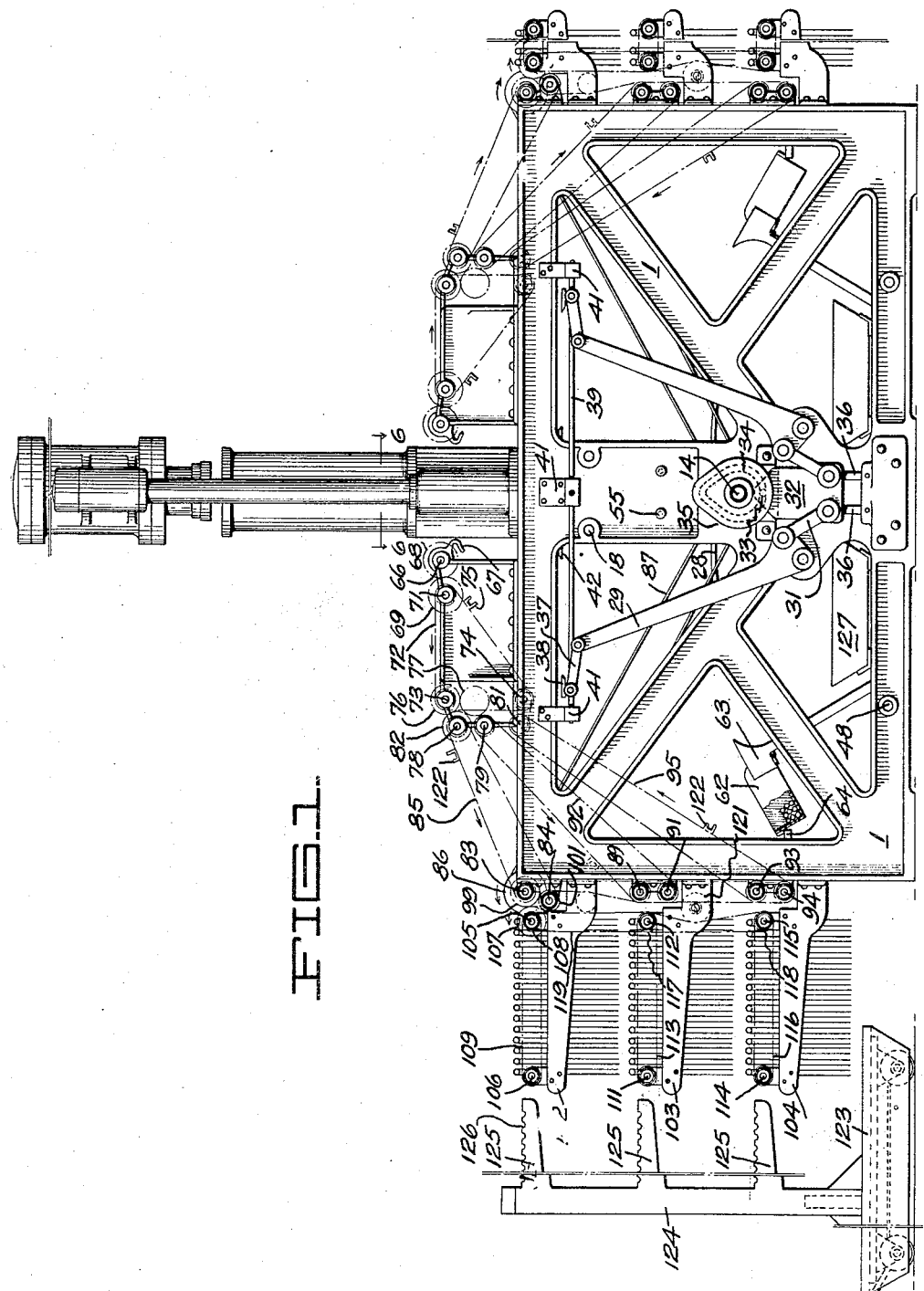
Fig. 1 is a side elevation of my improved macaroni machine.
Figure 2:
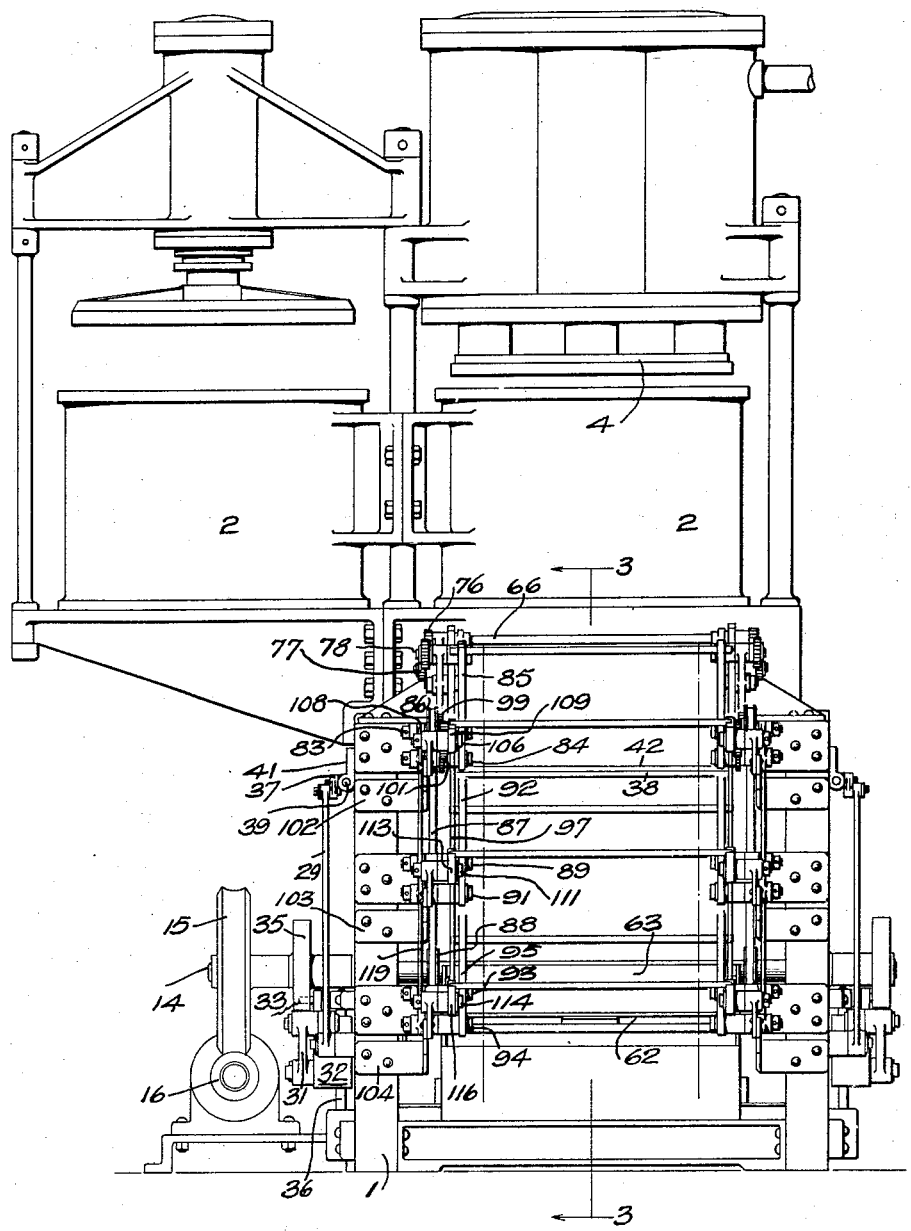
Fig. 2 is an end elevation of my improved macaroni machine.

Journaled on the interior of the frame 1 is a bell crank 29 (Fig. 1). One end of a link 31 is pivoted to the short arm of the bell crank 29 while the other end of the link 31 is pivoted to a vertically sliding block 32. To the upper end of the block 32 is secured a pin 33. This pin 33 is engaged in a cam shaped slot 34 provided in the cam 35 which is keyed to the main shaft 14. The block 32 slides vertically on the guide members 36. At the outer end of the longer arm of the bell crank 29 is pivoted a link 37, which in turn is secured to a movable blade 38. This blade 38 is horizontally slidable on a rod 39 which is secured to the frame 1 by means of straps 41. The bell crank actuated movable blade 38 cooperates with a stationary blade 42 which is secured to the frame 1 by means of clips 43 and 44 (Fig. 3).

A horizontally disposed endless conveyor 45 operates about rollers 46 and 47, which in turn are secured to the frame 1, by means of shafts 48 and 49. The shaft 49 as shown in Fig. 4 carries a gear 51 which meshes with an idler 52 journaled to the frame 1. A vertically disposed endless conveyor 53 operates about suitable shafts 54 and 55. The shaft 54 carries a gear 56 which meshes with the idler 52 (Fig. 4). The shaft 54 also carries a pulley 57 which serves to rotate the shaft 54 by means of a crossed belt 58 driven by a pulley 59 keyed to the shaft 14. The endless conveyors 45 and 53 are provided with U-shaped rod supporting members 61 and the conveyors are so related that rods carried by conveyor 45 are discharged on to the U-shaped members of the conveyor 53. A rod hopper 62 is hingedly secured to a chute 63. A clip 64 serves to support the free end of the hopper 62 and a bracket 65 serves to hold the chute in place on the frame 1. The lower end of the chute 63 is directed just above the outer upper end of the conveyor 45 (Fig. 3).

A shaft 66 is journaled in the upper central portion of the frame 1. This shaft is provided with hook members 67 for engaging the rods as they are discharged by the member 21 from the end of the arm 17. The shaft 66 also carries a gear 68 which meshes with a gear 69 carried by a shaft 71.

An endless conveyor 72 operates about the shaft 71 and shafts 73 and 74, all of which are journaled on the frame 1. The conveyor 72 is provided with U-shaped rod supporting members 75, similar to the U-shaped member carried by the endless conveyors 45 and 53. The shafts 66 and 71 are so spaced and the hook members 67 and 75 are so designed that the rod engaged by the hook member 67 is discharged on to the hook members 75 of the conveyor 72. Keyed to the shaft 73 is a gear wheel 76 which meshes with an idler 77 carried by the frame 1.

Journaled to the frame 1 just outwardly of the shafts 73 and 74 are shafts 78, 79 and 81. Keyed to the shaft 78 is a gear wheel 82 which meshes with the idler 77. Journaled in the outer upper end of the frame 1 are a pair of shafts 83 and 84. Carried by the shafts 78, 83 and 84 is an endless conveyor 85. Keyed to the shaft 83 is a pulley 86 driven by a belt 87. The belt 87 is driven by means of a pulley 88 keyed to the main shaft 14. Journaled on the frame 1 just below the shafts 83 and 84 are a pair of shafts 89 and 91, and operating about the shafts 89 and 91, and the shaft 79 is an endless conveyor 92. Just below the shafts 89 and 91 are journaled a pair of shafts 93 and 94, about which, together with the shaft 89 an endless conveyor 95 operates. The shafts 89, 91 and 93 are driven by means of a belt 96 which in turn is driven by means of a pulley 97 keyed to the shaft 83. An adjustable idler 98 may be used to take up the slack in the belt 96. Keyed to the shaft 83 is a gear wheel 99 which meshes with an idler gear wheel 101 carried on the shaft 84.

Secured to the end of the frame 1 are horizontally disposed brackets 102, 103 and 104 (Fig. 1). Carried by the bracket 102 are a pair of spaced shafts 105 and 106. Keyed to the shaft 105 is a gear wheel 107 which is driven by the idler gear wheel 101. A pulley 108 is also keyed to the shaft 105. Operating about the shafts 105 and 106 is an endless conveyor 109. The bracket 103 carries a pair of spaced shafts 111 and 112 about which, an endless conveyor 113 operates. The bracket 104 carries a pair of spaced shafts 114 and 115 about which an endless conveyor 116 operates. Keyed to the shaft 112 is a pulley 117 and keyed to the shaft 115 is pulley 118. The pulleys 117 and 118 are driven by means of a belt 119 which in turn is driven by means of the pulley 108 keyed to the shaft 105. An adjustable idler pulley 121 may be used to take up the slack in the belt 119. All of the endless conveyors used throughout the system are provided with U-shaped rod supporting lugs 122. It will be noted from an inspection of Figs. 1 and 3 in particular, that the distance between any two cooperating conveyors is such that the rods carried by one conveyor will discharge onto the U-shaped rod support of the cooperating conveyor.

A truck 123 is provided with an upright 124 which in turn carries sets of horizontally disposed brackets 125. The brackets 125 may be provided with notches 126. The truck 123 is provided with means by which it can be lowered and raised and it will be noted from an inspection of Fig. 1 that the truck in its raised position supports the bracket 125 on a level with the upper surfaces of the conveyors 109, 113 and 116. A refuse container 127 may be provided beneath the cutting mechanism of my device to take care of any possible waste.

The operation of my device is as follows:

The cylinders 2 are loaded with dough and the hydraulically operated pistons 4 are caused to move downward and thereby cause a series of parallel staggered dough strings to be extruded. The motor which drives the main shaft 14 is set into operation and the rod chute 63 fed with rods from the hoppers 62. As the dough strings S assume the position as shown in Fig. 3 the arm 17 takes a position in back of the vertically disposed rod carried by the conveyor 53, and as is shown in dotted lines, the rod retaining member 21 is held in its open position due to the fact that the hook 28 engages on a pin 30 secured to the frame 1. The rotation of the shaft 14 causes the cam 9 to rotate and due to the configuration of the cam allows the rack 5 to move suddenly downward. The downward movement of the rack 5 causes the arm 17 to move suddenly upward in the path of a circle and in so moving to engage one of the rods carried by the conveyor 53. This rod engages a hanging string of macaroni at substantially the mid-point and is then moved so that the string is formed into a loop as shown in Fig. 3. At the end of the upward stroke of the arm 17, the rod 28 engages with a pin 40 thereby insuring a sufficient rotation of the member 21 to permit the rod to be discharged. The movable blades 38 are moved inwardly due to the rotation of the slotted cam member 35, thereby cutting the loop of macaroni. The rotation of the pulley 88 keyed to the shaft 14 causes the entire system of conveyors to operate and indirectly causes the hook members 67 to grab the rod held at the end of the member 17. The rod carried by the hook shaped members 67 is then discharged down to the U-shaped rod carrying members carried by the endless conveyor 72. This conveyor in turn discharges its rod to the endless conveyors 85, 92 and 95. The conveyors 85, 92 and 95 in turn discharge the rod carried by them to the endless conveyors 109, 113 and 116. The notched horizontal bracket 125 of the truck 123 can be placed beneath the latter conveyors and the truck thereby loaded. It will be noted that in order that the endless conveyors 85, 92 and 95, be alternately fed with rods, the U-shaped rod members on the various conveyors will have to be properly spaced.

The cam 9 has been designed to impart a quickly upward motion to the arm 17, and to return the arm 17 in time to loop the next series of dough strings as they reach their lower-most position. This quick movement of the arm 17 cooperating with the movement of the cutters 38 is a very important feature of my invention as it is by this motion that the dough strings are prevented from stretching during the looping action. By preventing the strings from stretching during the looping process, I am enabled to keep the ends of the loops a uniform length, thereby obviating the necessity of trimming the ends of the loops and causing an unnecessary and costly waste of material. It will be noted that my device is entirely automatic from the time that the cylinders are loaded with dough until the macaroni loops are loaded onto the trucks.

I claim:

1. In a mechanism of the class described, means for forming a plurality of dough strings, a swinging rod support, means including a cam actuated rack for quickly moving said support upwards substantially above the string forming means, an endless conveyor for supplying rods to said support, and cutting means operable at the end of the upward movement of the support to sever the strings, said cutting means being adjacent to the string forming means so that looped lengths of dough of substantially equal length are provided.

2. In a mechanism of the class described, means for forming a plurality of hanging dough strings, a pivoted rod support provided at its inner end with a gear segment and at its outer end with a slotted U-shaped rod retaining mechanism, means including a vertically movable cam actuated rack cooperating with said gear segment to swing said rod support about its axis, a system of endless conveyors for feeding rods to said support, and cutting means operable at the limit of the movement of the support.

3. In a mechanism of the class described, means for continuously extruding a plurality of dough strings, a periodically swinging rod support provided at its outer end with an automatic rod retaining means, means including a cam actuated rack for periodically quickly moving said support upwards substantially above the point of extrusion of said dough strings, an endless conveyor for feeding rods to said suport, and cutting means quickly operable at the end of the upward movement of the support for severing the dough strings.

In testimony whereof, I have hereunto set my hand.

DOMENICO F. MERLINO.